United States Patent [19]
Chen et al.

[11] Patent Number: 5,512,901
[45] Date of Patent: Apr. 30, 1996

[54] BUILT-IN RADIATION STRUCTURE FOR A MILLIMETER WAVE RADAR SENSOR

[75] Inventors: Chun-Hong H. Chen, Torrance; Hsi-Shen E. Tsou, Rancho Palos Verdes, both of Calif.

[73] Assignee: TRW Inc., Redondo Beach, Calif.

[21] Appl. No.: 117,266

[22] Filed: Sep. 7, 1993

Related U.S. Application Data

[63] Continuation-in-part of Ser. No. 767,953, Sep. 30, 1991, Pat. No. 5,315,303.

[51] Int. Cl.$^6$ .................................................. G01S 7/28
[52] U.S. Cl. ..................... 342/175; 342/70; 343/700 MS
[58] Field of Search .......................... 342/175, 70, 200, 342/27; 343/700 MS

[56] References Cited

U.S. PATENT DOCUMENTS

| | | | |
|---|---|---|---|
| 4,169,268 | 8/1979 | Schell et al. | 342/909 |
| 4,401,988 | 8/1983 | Kaloi | 343/700 MS |
| 4,692,764 | 9/1987 | Bonar | 342/71 |
| 4,893,126 | 1/1990 | Evans | 342/175 |
| 4,931,799 | 6/1990 | Wen et al. | 342/110 |
| 4,967,201 | 10/1990 | Rich, III | 342/175 |
| 5,008,678 | 4/1991 | Herman | 342/158 |
| 5,115,245 | 5/1992 | Wen et al. | 342/175 |
| 5,303,419 | 4/1994 | Ittipiboon et al. | 455/327 |
| 5,315,303 | 5/1994 | Tsou et al. | 343/27 |
| 5,317,324 | 5/1994 | Naito et al. | 343/700 MS |
| 5,365,243 | 11/1994 | Büchler et al. | 343/753 |
| 5,367,308 | 11/1994 | Weber | 343/700 MS |

FOREIGN PATENT DOCUMENTS

| | | |
|---|---|---|
| 0535780 | 6/1992 | European Pat. Off. . |
| 2373891 | 12/1977 | France . |
| 2697680 | 11/1992 | France . |
| 8711782 U | 8/1987 | Germany . |
| 4003057 | 2/1990 | Germany . |
| 1562866 | 11/1977 | United Kingdom . |

OTHER PUBLICATIONS

Agrawal & Imbriale, "Design Of A Dichroic Subreflector", IEEE Transactions On Antennas And Propagation, vol. AP–27, No. 4, Jul. 1979.

Chen, Ingerson & Chen, "The Design Of Wide–band Sharp Cut–Off Dichroic", IEEE Antennas and Propagation Symposium, vol. 2, pp. 708–711, 1981.

Tsao & Mittra, "Spectral–domain Analysis of Frequency Selective Surfaces Comprised of Periodic Arrays of Cross Dipoles and Jerusalem Crosses", IEEE Transactions On Antennas and Propagation, vol. Ap–32, No. 5, May 1984.

C. Balanis, "Antenna Theory: Analysis & Design", pp. 497–501.

T. Kong, "Electromagnetic Wave Theory", pp. 366–376.

T. Milligan, "Modern Antenna Design", p. 70.

*Primary Examiner*—John B. Sotomayor

[57] ABSTRACT

A compact radar system includes a dielectric substrate having an upper and lower surface. A ground plane is formed on the upper surface of the dielectric substrate and includes a radiating slot formed therein. A radar transceiver is located below the dielectric substrate and generates transmit signals. A frequency selective surface spaced above the dielectric substrate includes a radiating aperture with a plurality of uniformly spaced holes. The frequency selective surface decreases flow of electromagnetic energy from the radiating slot in one direction towards the transceiver and increases the flow of electromagnetic radiation in an opposite direction away from the transceiver.

36 Claims, 9 Drawing Sheets

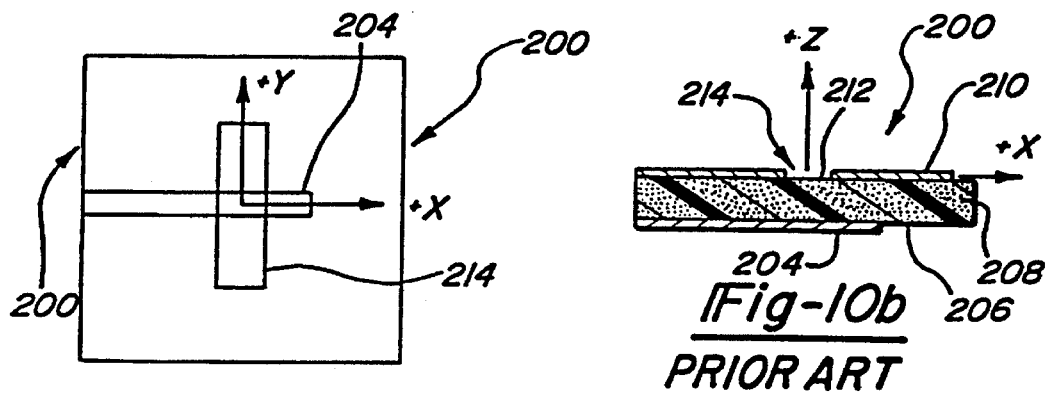
Fig-10a PRIOR ART
Fig-10b PRIOR ART
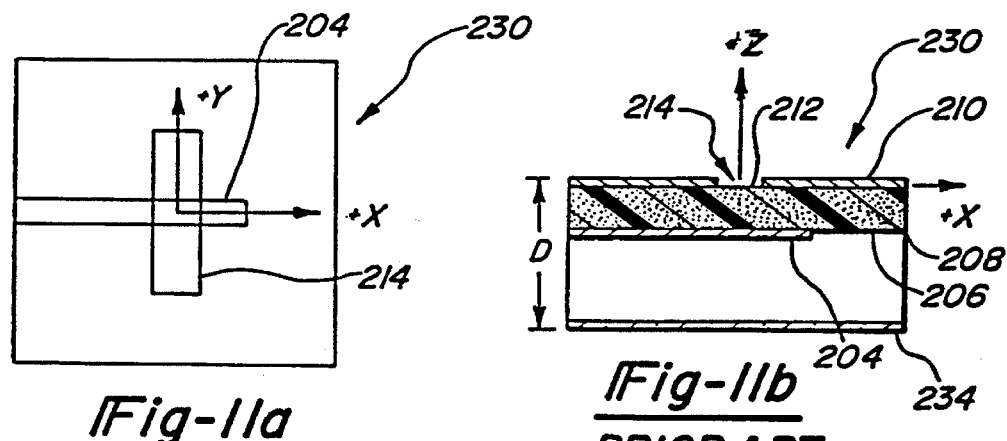
Fig-11a PRIOR ART
Fig-11b PRIOR ART
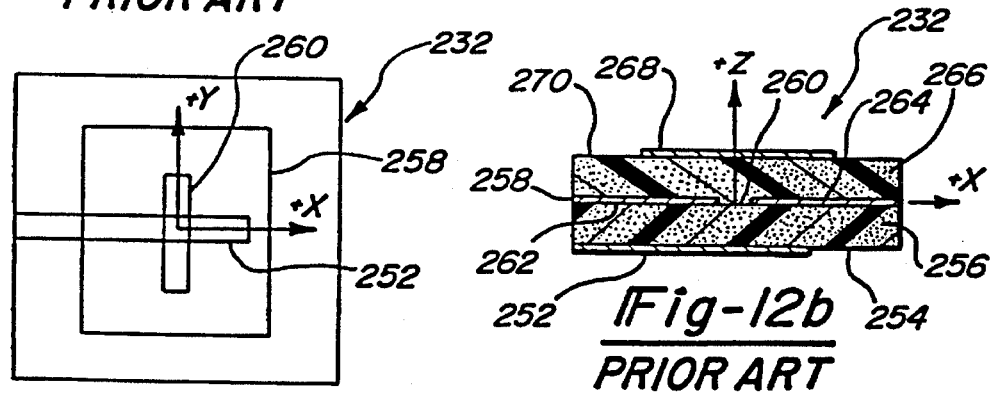
Fig-12a PRIOR ART
Fig-12b PRIOR ART

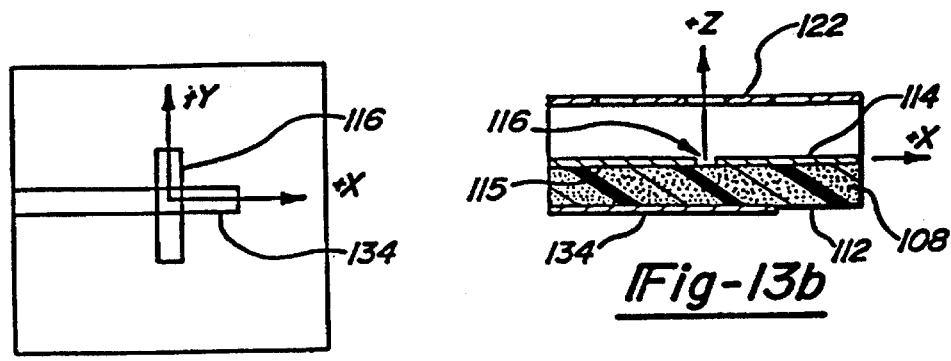
Fig-13a
Fig-13b
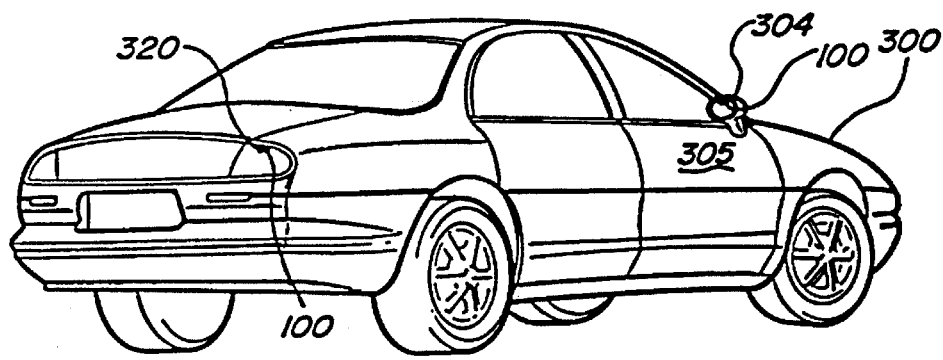
Fig-14a
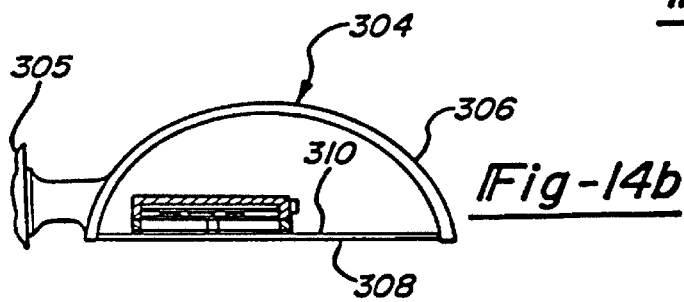
Fig-14b
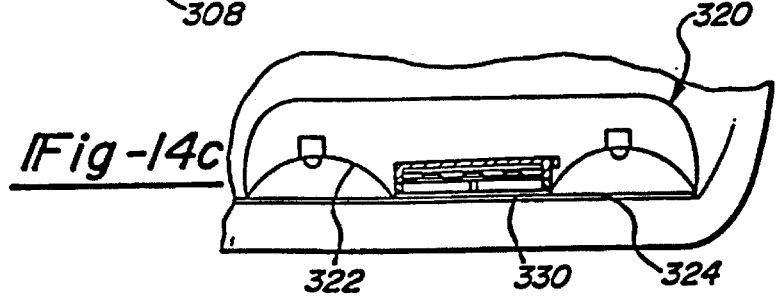
Fig-14c 5,512,901

BUILT-IN RADIATION STRUCTURE FOR A MILLIMETER WAVE RADAR SENSOR

CROSS-REFERENCE TO RELATED APPLICATIONS

This application is a continuation-in-part of U.S. patent application Ser. No. 07/767,953 filed Sep. 30, 1991 now U.S. Pat. No. 5,315,303.

BACKGROUND OF THE INVENTION

1. Technical Field

This invention relates to radar sensors and, more particularly, to a compact, flexible, and built-in radiation structure for a millimeter wave radar sensor.

2. Discussion

Radar sensors are generally employed for detecting objects within a desired field. Typical sensing systems have been developed which employ radar, laser, infrared (IR), or ultrasonic principles. However, each of these systems has its drawbacks. Current radar sensors operate at frequencies which are too low to incorporate the advanced monolithic millimeter wave integrated circuit (MMIC) and compact patch antenna technology. Generally, these sensing units are bulky and difficult to integrate into a host system. In addition, current radar sensing units require a large number of components which make the units costly. As a result, these systems are limited in modularity and flexibility, and therefore, applications. Typical laser sensors generally suffer from high cost, in addition to potential health hazards. Futhermore, they are limited by environmental conditions such as fog and smoke. Infrared and ultrasonic sensors have limitations which include sensitivity to environmental interferences, as well as interference from other similar sources, in addition to noise.

There is a need for an effective compact, flexible and integrated radar sensor that can be easily integrated into many systems for various applications. In particular, there exists a need for a compact, low cost, flexible radar sensor for automotive and space and defense-related applications and the like. Such applications may include integrating such a radar sensor onto an automotive vehicle to provide a blind spot detector for crash avoidance purposes. For advanced vehicle designs, such as those involving four-wheel drive functions, there is a need for a smart sensor to determine the true ground speed of the vehicle for cruise control purposes, accurate vehicle speed measurement, and four-wheel steering. In addition, there exists a need for a smart sensor to determine the vehicle height and to project the road surface ahead for advanced adaptive suspension systems. Furthermore, for military applications, there exists a need for a compact, modular, low cost sensor for collision avoidance or armored vehicles, heavy robotic equipment and all types of transportation equipment during night operations and under adverse conditions such as fog and battle field smoke.

Sensor systems have been developed and provided for such applications. Typical systems have generally employed radar, laser, infrared, and ultrasonic sensors. However, these systems have not been widely deployed because of high cost, poor performance, excessive size, and limited flexibility.

It is therefore desirable to obtain an effective, low cost, compact and safe to operate radar sensor. It is further desirable to obtain such a radar sensor which can be easily integrated into various systems. Such a system may include an automotive vehicle for providing a blind spot detector, a true ground speed measuring device, a vehicle height measurement device, and other various applications.

Conventional methods for constructing a radar sensor use electronics and an antenna which are separate components. The electronics are typically packaged inside a sealed conductive box for environmental protection and electromagnetic shielding. The electronics and the antenna are then assembled. Another conventional method packages the electronics inside a horn antenna. Still another approach utilizes feed assemblies in combination with reflector or lens antenna systems. Such designs are bulky and expensive.

Therefore, a radar system which integrates the electronics and the antenna system into a compactly packaged radar system is desirable.

SUMMARY OF THE INVENTION

A compact radar system includes a dielectric substrate having an upper and lower surface. A ground plane is formed on the upper surface of the dielectric substrate and includes a radiating slot formed therein. A radar transceiver is located below the dielectric substrate and generates transmit signals. A frequency selective surface spaced above the dielectric substrate includes a radiating aperture with a plurality of uniformly spaced holes. The frequency selective surface decreases flow of electromagnetic energy from the radiating slot in one direction towards the transceiver and increases the flow of electromagnetic radiation in an opposite direction away from the transceiver.

In another feature of the invention, the ground plane further includes a receiving slot formed therein. The radar transceiver receives reflected signals and the frequency selective surface includes a receiving aperture including a plurality of spaced holes.

In yet another feature of the invention the radar system further includes an upper and lower housing for enclosing the radar system.

In still another feature of the invention the radar transceiver includes radiating and receiving microstrip feedlines connected to the radiating and receiving slots. The microstrip feedlines can be formed on the lower surface of the dielectric substrate.

In other features of the inaction: the radar system further includes: a digital signal processing circuit located between the dielectric substrate and the lower housing; a spacer for spacing the frequency selective surface above the ground plane; and the radiating aperture of the frequency selective surface substantially matches an impedance of the radiating microstrip feedline.

Other objects, features and advantages will be readily apparent.

BRIEF DESCRIPTION OF THE DRAWINGS

The various advantages of the present invention will become apparent to those skilled in the art by reading the following specification and by reference to the following drawings in which:

FIG. 10a is a top view of a slot radiator according to the prior art;

FIG. 10b is a side view of the slot radiator of FIG. 10a;

FIG. 11a is a top view of a slot radiator including a reflector ground plane according to the prior art;

FIG. 11b is a side view of the slot radiator with the reflector ground plane of FIG. 11a;

FIG. 12a is a top view of a slot-coupled patch radiator according to the prior art;

FIG. 12b is a side view of the slot-coupled patch radiator of FIG. 12a;

FIG. 13a is a top view of a slot-coupled radiator incorporating a frequency selective surface according to the present invention;

FIG. 13b is a side view of the slot-coupled radiator incorporating a frequency selective surface of FIG. 13a;

FIG. 14a is a perspective view of a vehicle incorporating the radar system of FIG. 6 in a side view mirror and tail light assembly;

FIG. 14b is a top view of the side view mirror of FIG. 14a; and

FIG. 14c is a top view of the tail light assemble of FIG. 14a.

DETAILED DESCRIPTION OF THE PREFERRED EMBODIMENT

Figure 1:
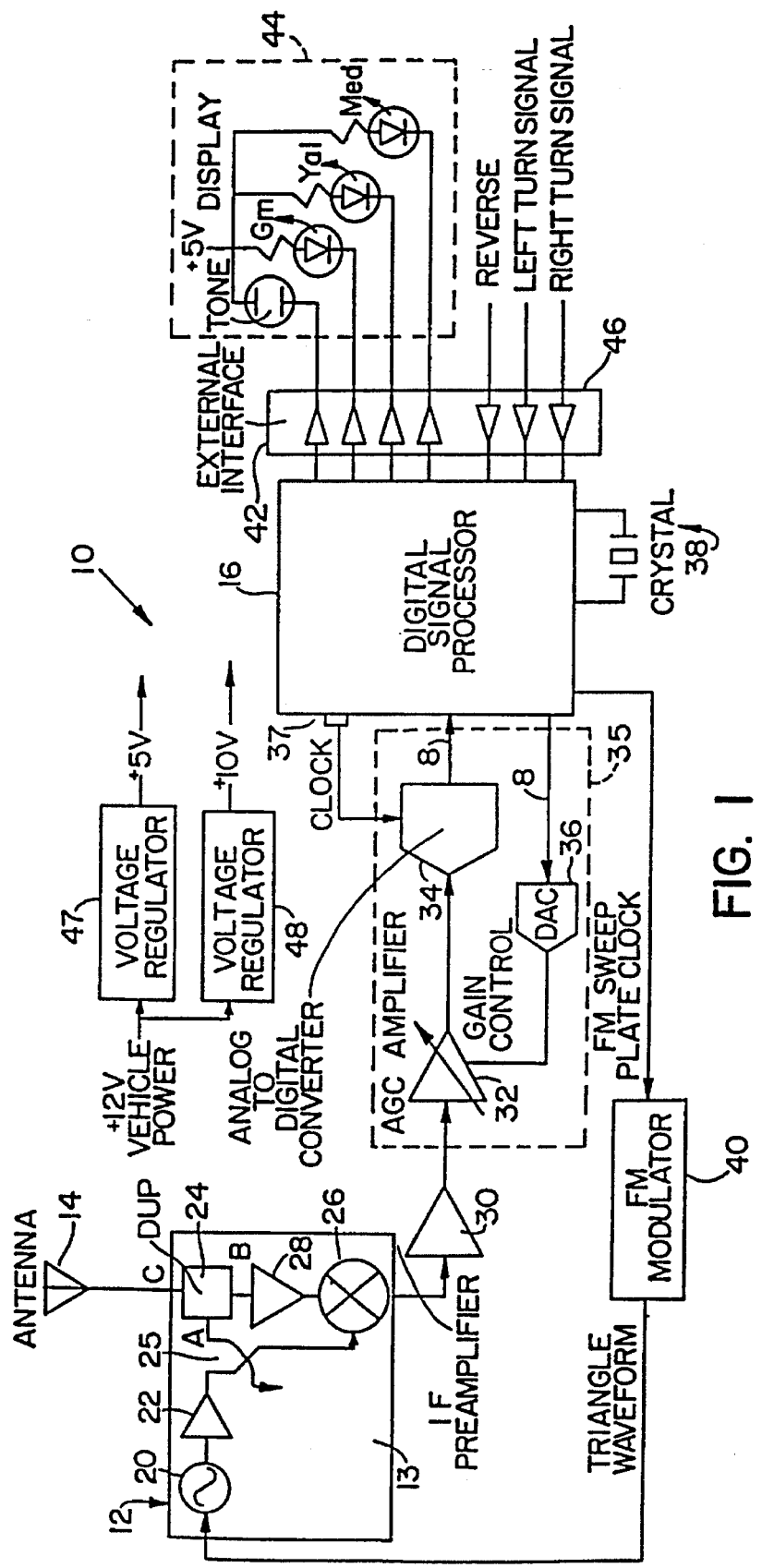
FIG. 1 is a schematic block diagram which illustrates a compact millimeter wave radar sensor in accordance with the present invention.

Turning now to FIG. 1, a schematic block diagram is shown therein which illustrates a compact millimeter wave (MMW) radar sensor 10 in accordance with the present invention. Radar sensor 10 employs a monolithic millimeter wave integrated circuit (MMIC) transceiver 12. The transceiver 12 provides MMW transmit and receive functions which are integrated onto a single monolithic chip 13 using standard photolithographic techniques known in the art. Transceiver 12 includes a voltage controlled oscillator (VCO) 20 which is connected to an amplifier 22. Amplifier 22 is further connected to a coupler 25 which is connected to port A of duplexer 24. A pre-amplifier 28 is connected to port B of duplexer 24 for amplifying a reflected signal received by antenna 14. A balanced mixer 26 is provided which has an input connected to the output of pre-amplifier 28. Balanced mixer 26 is further adapted to receive a leakage signal which is the result of the coupler 25 output of the transmitted signal generated by the voltage controlled oscillator 20 and the transmit amplifier 22. Balanced mixer 26 is adapted to provide the difference between the transmit signal and the reflected signal. The output of balanced mixer 26 is an intermediate frequency (IF) known as the beat frequency which contains the range information. In an alternate embodiment, duplexer 24 and coupler 25 may be removed and replaced with a simple coupler to allow for further cost savings and smaller size.

An antenna 14 is connected to port C of duplexer 24. The antenna 14 can be a microstrip patch antenna. Other antenna configurations will be readily apparent to those skilled in the art. The antenna 14 is adapted to transmit a high frequency modulated carrier signal throughout a desired field to be monitored. This transmitted signal may have a frequency of around 35 to 94 GHz. Higher frequency signal may also be employed. Antenna 14 is further adapted to receive a reflected signal which is the result of the transmitted signal reflecting off of objects located within the field.

An IF pre-amplifier 30 is connected to the output of the balanced mixer 26 for amplifying the IF output signal therefrom. Connected to the output of IF pre-amplifier amplifier 30 is an automatic gain control amplifier 32 which provides high dynamic range. An analog-to-digital converter 34 is connected to the output of the automatic gain control amplifier 32 for receiving a signal therefrom. The analog-to-digital converter 34 is further adapted to receive a clock signal from clock 37 of digital signal processor 16 and provide a digital output to the digital signal processor 16. Analog-to-digital converter 34 is a standard off-the-shelf 8-bit converter and is capable of handling IF signals and providing a dynamic range of about 48 dB. A digital-to-analog converter 36 is further connected to digital signal processor 16 for receiving an input signal therefrom. The digital-to-analog converter 36 is adapted to provide a gain control signal to the automatic gain control amplifier 32 which provides a dynamic range of about 50 dB. The automatic gain control amplifier 32 in combination with the analog-to-digital converter 34, the digital signal processor 16, and the digital-to-analog converter 36 make up a dynamic range adjustment control loop 35. Control loop 35 provides for the dynamic range required to process the variations in target reflections and the range of distance desired.

An FM modulator 40 is connected to digital signal processor 16 for receiving a square wave signal therefrom. FM modulator 40 is configured for providing a triangular modulation waveform signal at the same periodicity as the square waveform. The output of FM modulator 40 is connected to the input of the voltage controlled oscillator 20 of transceiver 12 for providing the frequency modulated signal thereto.

Digital signal processor 16 is further connected to an external interface 42. External interface 42 provides connection to an output display 44 and input terminals 46. Digital signal processor 16 is manufactured by AT&T and has a model number DSP16. Other suitable digital signal processors such as a Motorola 56001 and Texas Instruments TMS320C15 may also be used. Digital signal processor 16 performs all the necessary processing and embedded intelligence functions therein. Processor 16 includes processing capabilities for providing digital filtering, integrations and various other processing functions. In essence, digital signal processor 16 is adapted to provide control signals and detect any reflected signal from objects within the field being monitored and provide output responses therefrom. From the frequency shift and other information, the digital signal processor 16 provides the distance information.

A compact voltage regulator 47 provides the +5 v dc supply from a 12 v dc supply. Another compact voltage regulator 48 provides the +10 v dc supply from the 12 v dc supply. In a different embodiment, different voltage regulators may be used to provide the +5 v and +10 v dc from other voltage sources.

Figure 2A:
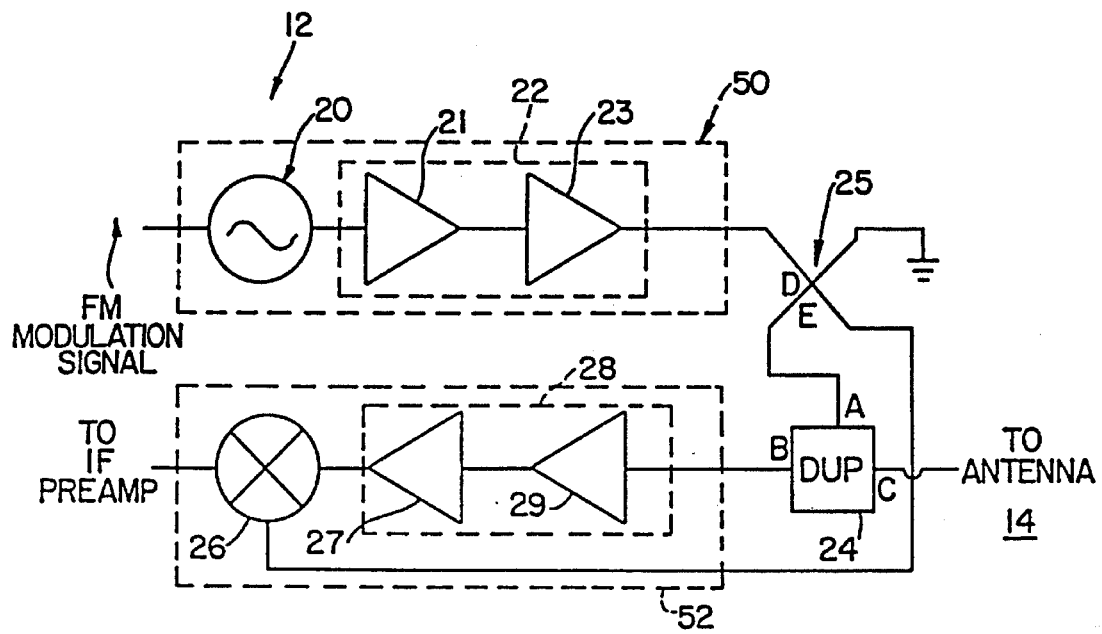
FIG. 2a is a block diagram which illustrates a monolithic millimeter wave integrated circuit (MMIC) transceiver.

FIG. 2a is a block diagram which illustrates one embodiment of the monolithic millimeter wave integrated circuit (MMIC) transceiver 12. Transceiver 12 includes a voltage-controlled oscillator (VCO) 20 adapted to receive the FM modulation signal from FM modulator 40 and provide a frequency modulated carrier signal therefrom. Voltage controlled oscillator 20 includes a single high electron mobility transistor (HEMT) and an associated tank circuit for providing the carrier signal. The voltage controlled oscillator 20 is modulated by applying a voltage to a varactor located in an oscillator tank circuit. Connected to the output of the voltage controlled oscillator 20 is a two-stage amplifier 22 having a first amplifier stage 21 and second amplifier stage 23. Amplifier 22 amplifies the signal which is then transmitted to the antenna 14 through the duplexer 24 and the coupler 25. The output of amplifier 22 is connected to port D of the coupler 25. The port E of the coupler 25 is connected to the port A of the duplexer 24. The transmit output to the antenna 14 is through port C of the duplexer 24. The combination of voltage controlled oscillator 20 in connection with the amplifier 22 forms a transmitter 50.

Transceiver 12 further includes a two-stage pre-amplifier 28 having a first stage 29 and second stage 27. Pre-amplifier 28 is adapted to receive and amplify the reflected signals gathered by the antenna 14. The balanced mixer 26 is connected to the output of the pre-amplifier 28. Together, balanced mixer 26 and the pre-amplifier 28 form the receiver 52. The duplexer 24 and the coupler 25 form a network for isolating the transmitter 50 from the receiver 52. The coupler provides the reference transmit signal path to the balanced mixer 26 of the receiver 52 and the transmit path to the duplexer 24 and antenna 14. The balanced mixer 26 provides the difference between the reference signal and the reflected signal to obtain an intermediate frequency (IF) known as the beat frequency. The resulting beat frequency contains the difference in frequency between the two signals.

Figure 2B:
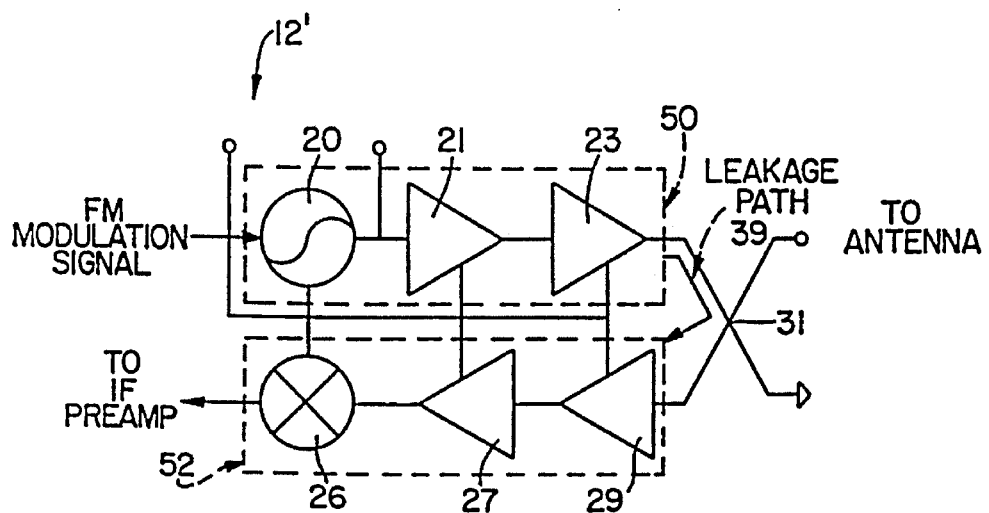
FIG. 2b is a block diagram which illustrates an alternate embodiment of a monolithic millimeter wave integrated circuit (MMIC) transceiver.

In an alternate embodiment of the MMIC transceiver 12' as shown in FIG. 2b, the duplexer 24 and the coupler 25 of the original implementation as shown in FIG. 2a are replaced with a simple coupler 31 to allow for further cost savings and smaller size of the MMIC transceiver. The voltage controlled oscillator 20 and the two-stage transmit amplifier 21 and 23 are basically the same as in the original transmitter except in chip layout. The two-stage amplifier 27 and 29, and the balanced mixer 26 are similar to the original embodiment, except in chip layout and in that the balanced mixer 26 is further adapted to receive a leakage transmit signal which is used as the reference signal. The leakage signal is the result of the signal generated by the voltage controlled oscillator 20 being transmitted across a leakage path 39 from amplifier 23 to amplifier 29 across the new coupler 31. This alternate embodiment of the MMIC transceiver advantageously utilizes this leakage signal while providing isolation between the transmitter 50 and the receiver 52.

Figure 3:
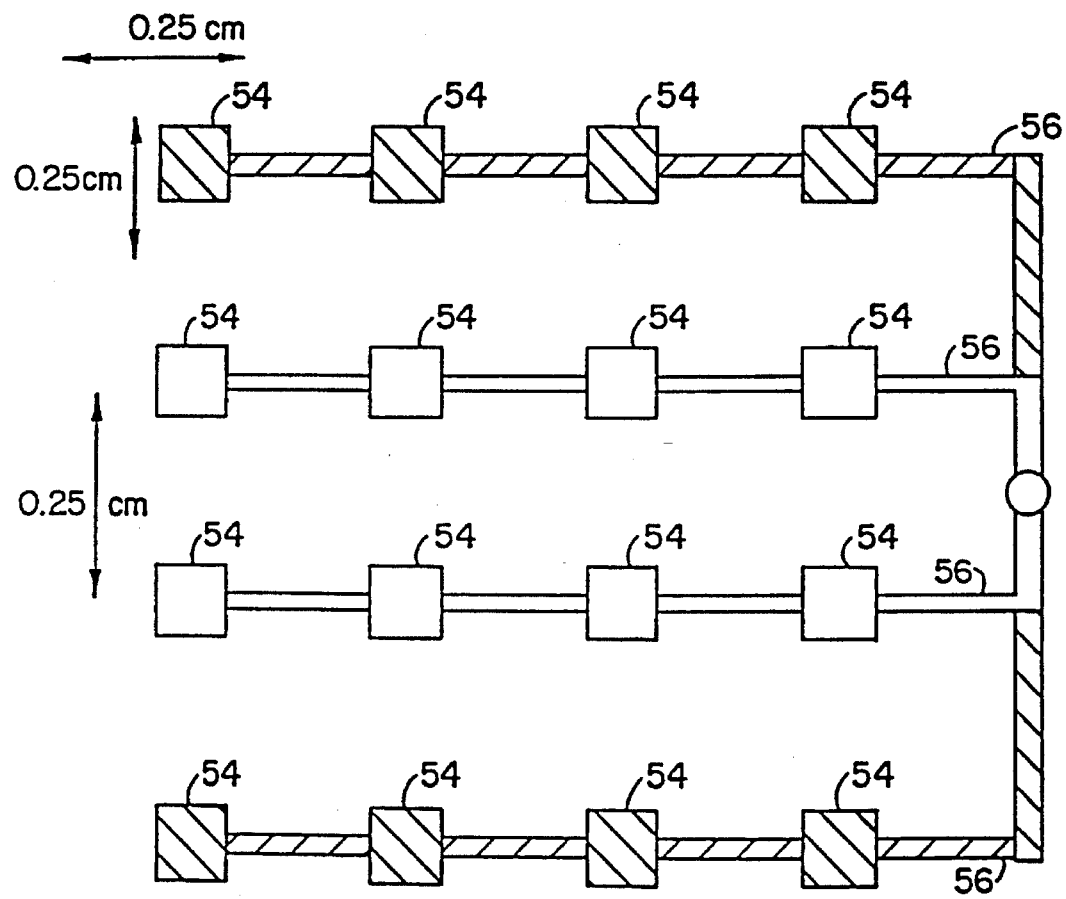
FIG. 3 is a schematic diagram which illustrates a millimeter wave band microstrip patch antenna design example.

FIG. 3 illustrates the antenna 14 designed as a millimeter wave band microstrip patch antenna. A plurality of radiating/receiving microstrip patches 54 are provided in a 4×4 array. In alternate embodiments, a 4×2 and a 4×1 array may also be used. Microstrip patches 54 are connected by microstrip feedlines 56. The antenna 14 is adapted to be etched on a printed circuit board and may be adapted to provide for a plurality of such microstrip patches 54 in various array designs. The array design essentially determines the beam shape which may be adapted to provide for various coverage requirements for different applications. The resulting antenna 14 is small and planar, and has a patch pattern that can easily be changed to adapt to various applications and mounting requirements. For automotive applications, the planar antenna enables incorporation of the radar sensor in the tail light assembly, side mirror assembly, or rear bumper of a vehicle. The particular antenna design example shown therein provides for an overall size which is less than 1.5 inches by 1.5 inches. However, various shapes and sizes may be used, depending on the particular application.

Figure 4:
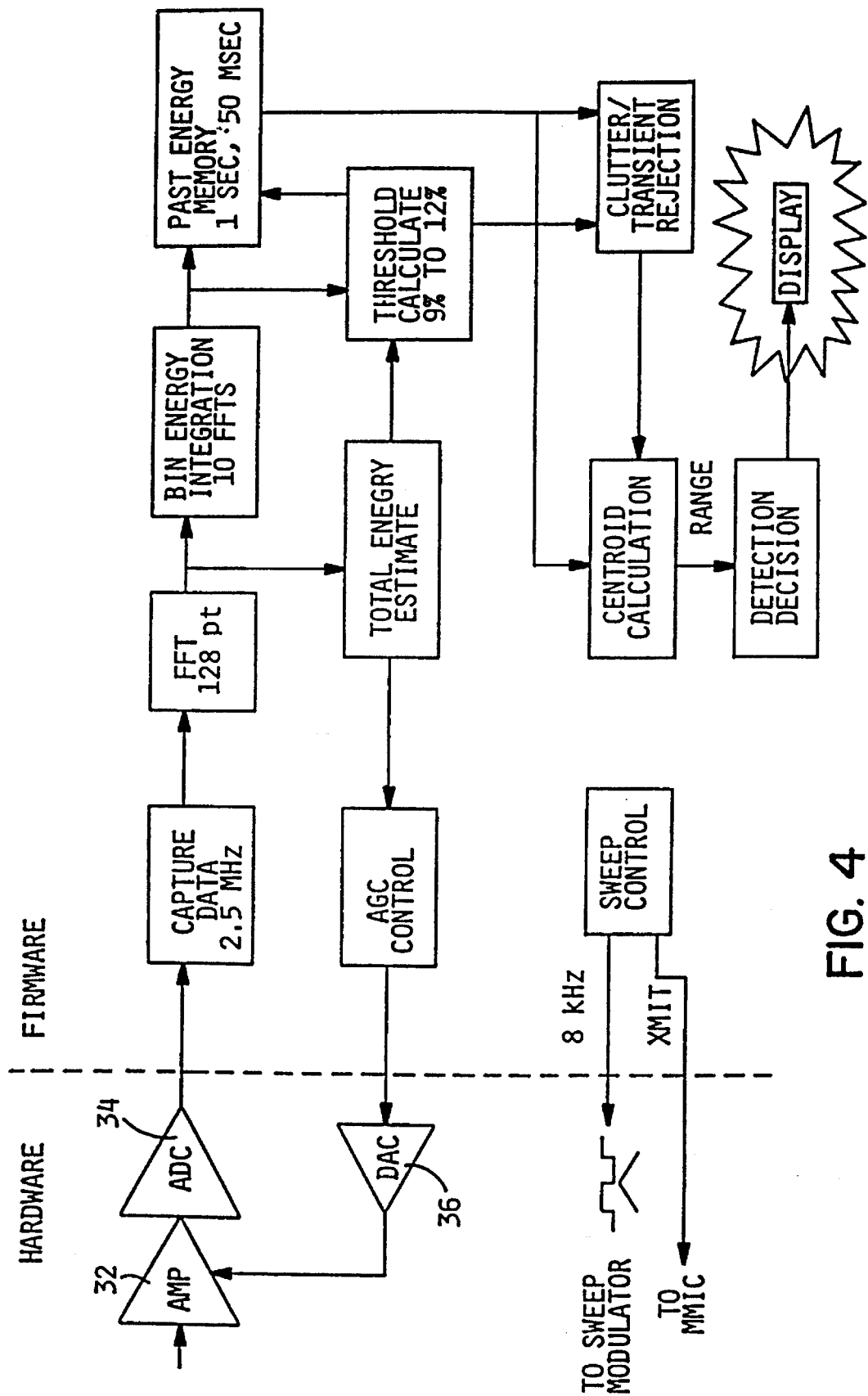
FIG. 4 is a block diagram which illustrates the major functions of a digital signal processor in accordance with the present invention.
Figure 5A:
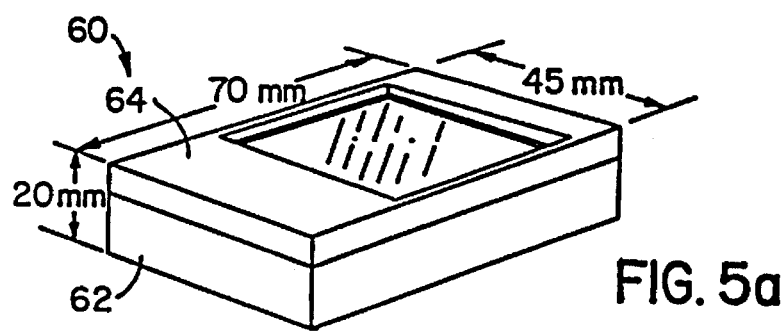
FIGS. 5(a–d) are assembly views of a compact radar sensor module example.
Figure 5B:
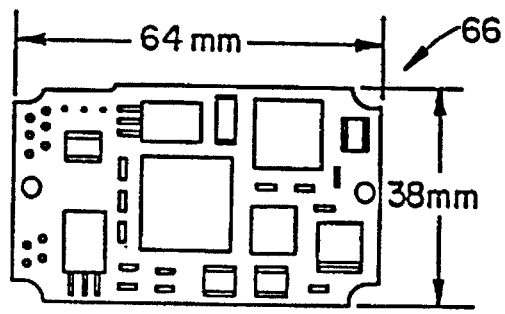
Figure 5C:
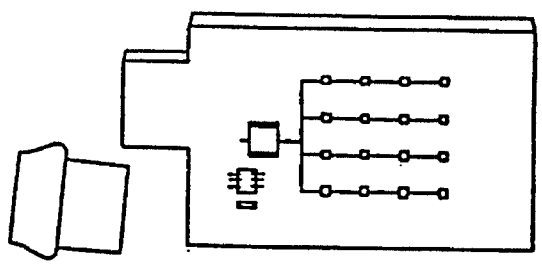
Figure 5D:
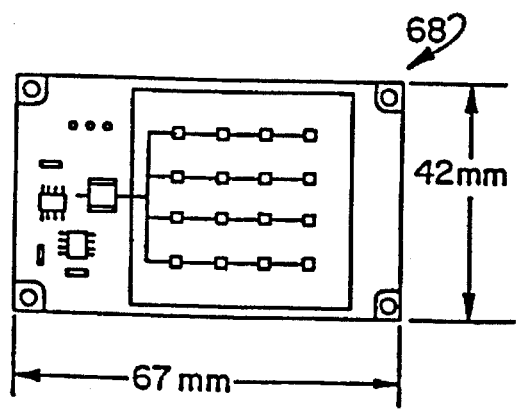

FIG. 4 is a block diagram which illustrates the major functions of the digital signal processor 16. The signal processing functions performed by the digital signal processor 16 include digital filtering and integration to remove clutter, reduce false alarms and to increase sensitivity. The embedded intelligence functions include decision logic, control, display, annunciation control, and self testing. The digital signal processor 16 performs these functions in firmware to achieve the lowest possible recurring costs. The firmware may include software such as machine code fabricated in read-only memory (ROM). The digital signal processor 16 reads the digitized data from the analog-to-digital converter 34 and calculates the gain control that is to be applied to the automatic gain control amplifier 32.

In operation, the firmware of digital signal processor 16 reads in a complete sweep of the radar data and captures the data at a sampling rate of about 2.5 megahertz. The digital signal processor 16 calculates a fast Fourier transform (FFT). The total energy is estimated from the FFT calculation and used to calculate the gain control signal which is applied to automatic gain control amplifier 32. The transformed data is further divided into range bins in order to detect valid returns. Several sweeps are transformed and accumulated, resulting in a 6 dB processing gain in the signal-to-noise ratio of the received signal. The digital signal processor 16 then weighs the spectrum to reduce the effects of clutter. A threshold decision function is applied to the range bins to detect valid returns. These returns are then compared to several past decisions from previous sweeps. By comparing past returns, the digital signal processor 16 adapts the decision thresholds and clutter weighing functions as the environment changes in order to increase differentiation of valid returns and reject disturbances and spurious returns. The digital signal processor 16 furthermore determines the closest valid return. Finally a periodically updated display provides the decision.

FIG. 5 illustrates the packaging design for a particular radar sensor example of this invention. A radar sensor module 60 is shown having a housing subassembly 62, a radome/cover 64 and an electronic subassembly having a support plate (not shown) and two printed circuit board assemblies 66 and 68. One of the printed circuit board assemblies 68 is laminated to the top of the support plate and has the patch antenna assembly etched thereon and the MMIC transceiver along with the preamplifier circuit. This assembly is connected by flexible jumper cable to the other multi-layer digital printed circuit board assembly 66 that is mounted to the rear portion of the support plate. This second printed circuit board assembly 66 has components mounted on both sides to minimize the module size. The radome/cover 64 is bonded over the top of the module 60 and provides impact protection as well as a moisture seal for the entire module 60. The invention discussed herein is not restricted to this particular module design, for different applications may require variations thereof.

Figure 6:
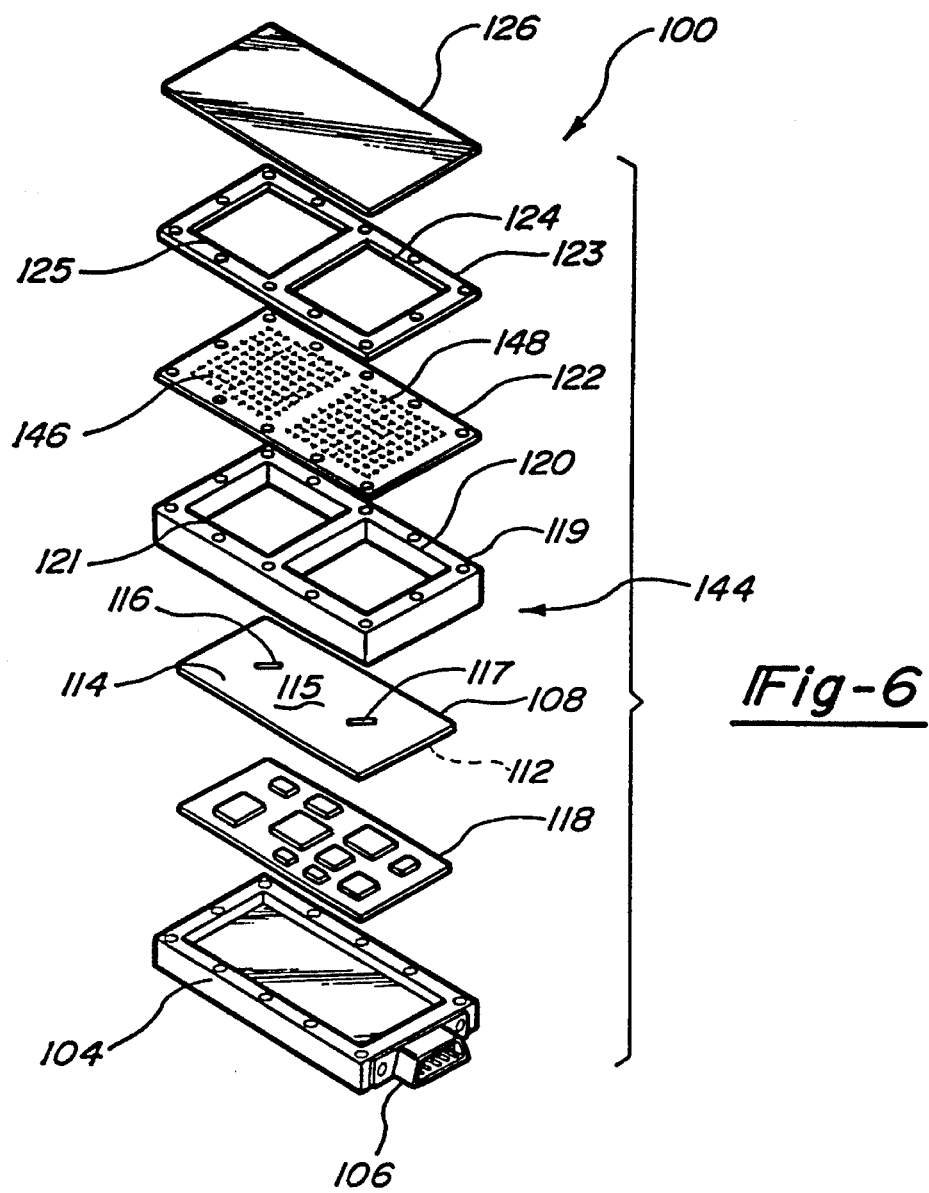
FIG. 6 is an assembly view of a compact packaging system for a radar system according to the present invention.
Figure 7:
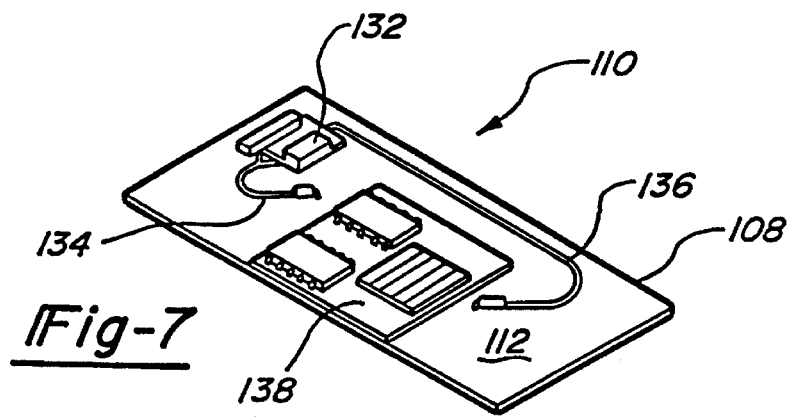
FIG. 7 is a view of a radar circuit fabricated on a bottom surface of a dielectric substrate.
Figure 8A:
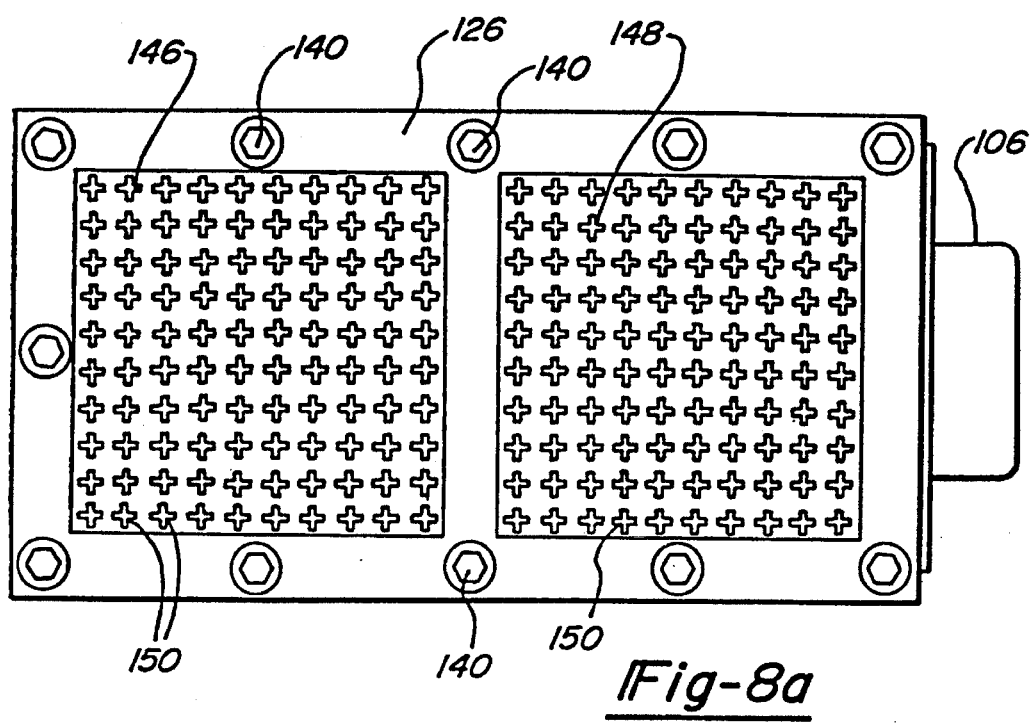
FIG. 8 is a top view of the radar system of FIG. 6 after assembly.
Figure 8B:
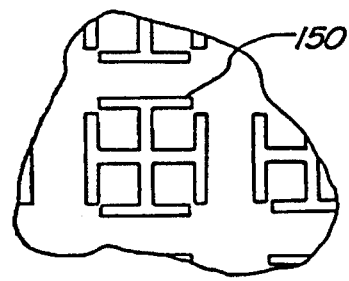
Figure 9:
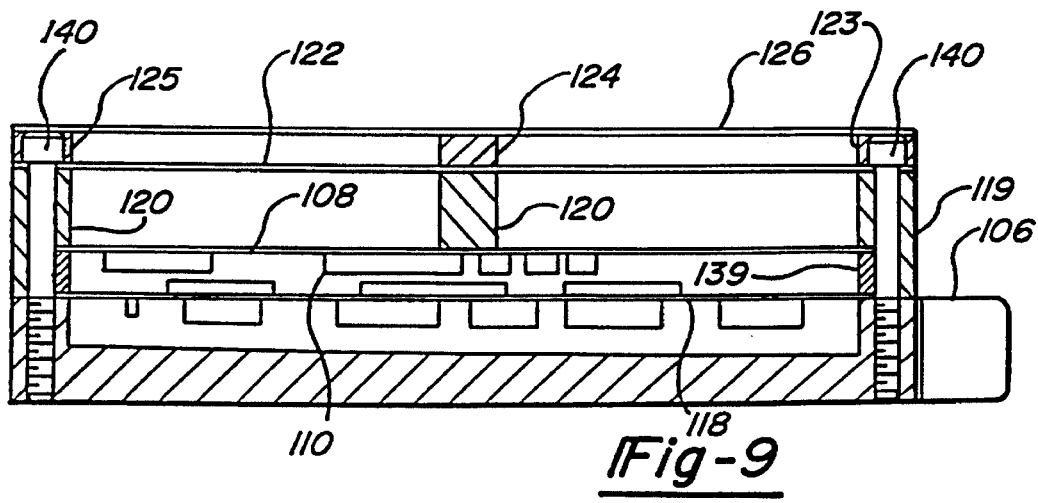
FIG. 9 is an end view of the assembled radar system of FIG. 8.

Referring to FIGS. 6–9, a compact built-in packaging system for a radar system 100 includes a lower electronics housing 104 with an integral connector 106. While the lower housing 104 in FIG. 6 is rectangular in shape, other shapes are contemplated. A dielectric substrate 108 includes a radar circuit 110 mounted on a bottom surface 112 thereof (see FIG. 7). A ground plane 114 is formed on a top surface 115 of the dielectric substrate 108. Slots 116 and 117 in the ground plane 114 transmit and receive electromagnetic energy as will be described further below.

The lower housing 104 positions and supports a digital signal processing circuit (DSPC) 118. The DSPC 118 can be the DSPC disclosed in conjunction with FIGS. 1–5, or a conventional DSPC can be used. A frame 119 including transmit and receive openings 120 and 121 is positioned over the dielectric substrate 108 to provide uniform spacing between the dielectric substrate 108 and a frequency selective surface (FSS) 122, described further below. A spacer 123 including transmit and receive openings 124 and 125 is positioned on an upper surface of the FSS 122. A radome 126 protects the radar system 100 from harmful effects of the environmental conditions in which the radar system 100 is operated (e.g., rain, dust, mud, etc.) without noticeably affecting the performance of the radar system 100.

The radome 126 can be made from a variety of materials. Transmission data for multiple materials through which the radar system 100 radiates and receives the transmit and reflected signals is illustrated in Table A (set forth below). "Transmission" refers to the percent of the transmitted signal which is radiated without absorption by the material. As can be seen from Table A, many different materials can be effectively utilized.

TABLE A

| Material | Thickness (mil) | Freq (GHz) | Transmission |
|---|---|---|---|
| Mylar | 5 | 35 | 99.5 |
|  |  | 140 | 95.0 |
| Teflon | 60 | 35 | 92.0 |
|  |  | 140 | 95.0 |
| Lexan | 55 | 35 | 72.0 |
|  |  | 140 | 81.0 |
| Lexan (coated) | 55 | 35 | 68.0 |
|  |  | 140 | 80.0 |
| Plexiglass | 375 | 35 | 60.0 |
|  |  | 140 | 60.0 |
| Plexiglass | 250 | 140 | 70.0 |
| Polyethylene | 5 | 35 | 99.0 |
|  |  | 140 | 100.0 |

The radar circuit 110 located on the bottom surface of the substrate 108 can include a MMIC transceiver 132, microstrip feedlines 134 and 136 connected to slots 116 and 117, and an IF/modulator circuit (IF/MC) 138 described in detail above in conjunction with FIGS. 1–5. A rectangular spacer 139 can be used to position the substrate 108 with respect to the DSPC 118, although other means for spacing are contemplated. Fasteners 140 connect the lower housing 104, the DSPC 118, the dielectric substrate 108, the frame 119, the FSS 122, the spacer 123, and the radome 126 into a compact integral unit. The radome 126 can be attached to the spacer 123. Alternately, the radome 126 can include a plurality of holes for receiving the fasteners 140, or the spacer 123 can be formed integrally with the radome 126. The dielectric substrate 108, the frame 119, and the lower housing unit 104 enclose the radar circuit 110 and the DSPC 118 in a hermetically sealed environment.

The FSS 122 is a perforated plate made of metal or metal-coated plastic. The FSS 122 includes a transmit aperture 146 and a receive aperture 148 each including a plurality of uniformly spaced holes 150. The FSS 122 is positioned above the substrate 108. Slots 116 and 117 which are fed by the microstrip feedlines 134 and 136 transmit and receive electromagnetic energy. The microstrip feedlines 134 and 136, the slots 116 and 117 formed in the ground plane 114, the frame 119, the dielectric substrate 108, and the FSS 122 form an integral antenna 144 for the radar system 100 while also forming part of an enclosure for the radar system 100.

Both the IF/MC 138 and the microstrip feedlines 134 and 136 are fabricated on the bottom surface 112 of the substrate 108 which can be made of Alumina or Quartz. The ground plane 114 fabricated on the top surface 115 of the substrate 108 using metal, for example copper or gold.

FIGS. 10, 11 and 12 illustrate several prior art antenna radiation configurations. FIG. 10a is a top view of and FIG. 10b is a side view of a slot radiator antenna 200 including a microstrip feedline 204 formed on a bottom surface 206 of a dielectric substrate 208. A ground plane 210 formed on a top surface 212 of the dielectric substrate 208 includes a slot 214 which radiates into an upper half-space (+Z direction) above the ground plane 210 and into a lower half-space (–Z direction) below the ground plane 210. It is desirable to maximize electromagnetic radiation in one direction in the Z plane (typically away from radar electronics) while minimizing electromagnetic radiation in an opposite direction in the Z plane, e.g. Where a radar or other circuits may be located.

Two configurations are offered by conventional antenna designs for obtaining maximum radiation in one direction in the +Z plane while minimizing radiation in the opposite direction in the –Z plane including a reflector ground plane configuration 230 illustrated in FIG. 11, and a slot-coupled patch configuration 232 illustrated in FIG. 12.

For purposes of clarity, reference numerals will be used from FIG. 10a where appropriate. The reflector ground plane configuration 230 in FIGS. 11a and 11b includes a reflecting ground plane 234 which reflects radiation in the –Z direction 180 degrees, in other words, in the +Z direction. If the ground plane 210 is spaced a distance "D" (which is approximately one quarter wavelength) from the reflecting ground plane 234, the reflected electromagnetic radiation from the reflecting ground plane 234 in the +Z direction is in phase with radiation emitted in the +Z direction by the ground plane 210.

However, the reflector ground plane configuration 230 cannot be effectively used with the integrated radar sensor 100 of the present invention. First, electromagnetic fields traveling between the ground plane 210 and the reflecting ground plane 234 adversely affect electronics located therebetween, for example the IF/MC 138, the DSPC 118, the microstrip feedline 134, etc. Second, the space "D" between the reflecting ground plane 234 and the ground plane 210 may be insufficient to accommodate the electronics located therebetween.

The conventional slot-coupled patch configuration 232 in FIGS. 12a and 12b includes a microstrip feedline 252 etched on a bottom surface 254 of a first dielectric substrate 256. A ground plane 258 having a slot 260 formed therein is fabricated on a top surface 262 of the first dielectric substrate 256. A bottom surface 264 of a second dielectric substrate 266 is in contact with the ground plane 258. A patch 268 is fabricated on a top surface 270 of the second dielectric substrate 266 and is designed to match impedance in the +Z direction to an impedance of the microstrip feedline 252 to obtain maximum electromagnetic energy transfer. In other words, the patch 268 creates a condition favoring flow of electromagnetic energy in the +Z direction. A length of the slot 260 is typically less than a resonant length to further reduce electromagnetic radiation in −Z direction.

However the slot-coupled patch configuration 232 cannot be effectively used with the integrated radar sensor 100 of the present invention. First, the slot-coupled patch configuration 232 has low efficiency due to high material loss at microwave frequencies. Second, the slot-coupled coupled patch on figuration 232 has a less rigid structure due to the first and second dielectric substrates 256 and 66 which are typically thin.

FIGS. 13a and 13b illustrate the integral antenna 144 of the present invention in detail. The microstrip feedline 134 is etched on the bottom surface 112 of the dielectric substrate 108. The ground plane 114 is fabricated on the top surface 115 and includes the slots 116 and 117 (not shown in FIGS. 13a and 13b) formed therein. The FSS 122 is spaced (by the frame 123) above the ground plane 114 with air, acting as a dielectric, located therebetween.

The FSS 122 according to the invention differs from conventional frequency selective surfaces. Traditionally, frequency selective surfaces include cross dipole (or Jerusalem cross, tripole, dipole, rectangular, circular disk) arrays etched on a dielectric substrate. In other words, metal such as copper is deposited or printed on the dielectric substrate in the particular shape chosen. Traditional frequency selective surface designs have been the subject of extensive study, for example see Agrawal & Imbriale, "Design of a Dichroic Subreflector", IEEE, Transactions On Antennas and Propagation, Vol. AP-27, No. 4, July 1979; Chen, Ingerson & Chen, "The Design of Wideband Sharp Cut-off Dichroic", IEEE Antennas and Propagation Symposium, Vol. 2, p. 708–711; and Tsao & Mittra, "Spectral-domain Analysis of Frequency Selective Surfaces Comprised of Periodic Arrays of Cross Dipoles and Jerusalem Crosses", IEEE Transactions On Antennas and Propagation, Vol. AP-32, No. 5, May 1984. All of the above are hereby incorporated by reference.

In contrast, the FSS 122 of the present invention (see FIG. 8a) is fabricated using a metal plate with holes 150 which can be in the shape of a cross, Jerusalem cross, tripole, dipole, rectangle or circle. Other shapes will be readily apparent. The radiation patterns and impedances for each of the shapes are known, for example, the impedance and radiation patterns of the conventional cross and Jerusalem cross (see FIG. 8b) formed on a dielectric substrate are discussed in the above incorporated references. Using Babinet's principle, the radiation patterns for the FSS 122 according to the invention can be derived. Babinet's principle is discussed in C. Balanis "Antenna Theory: Analysis & Design", page 497; T. Kong "Electromagnetic Wave Theory", page 366; and T. Milligan "Modern Antenna Design", page 70. All of the above are incorporated by reference.

The FSS 122 of the present invention is a complementary radiating structure to the conventional cross and Jerusalem cross radiators. The FSS 122 is a complimentary structure because when the FSS 122 is combined with the conventional cross (or other shape), a solid screen with no overlaps is formed. Extension of these principles to other shapes will be readily apparent.

The impedance, and the magnetic and electric fields of the FSS 122 can also be predicted from the impedance, and the magnetic and electric fields of the conventional cross (or other shape). Briefly, the magnetic field of the conventional cross radiator (or other shape) is related to the electric field of the complimentary FSS 122. Similarly the electric field of the conventional cross (or other shape) radiator is related to the magnetic field of the FSS 122. The impedances of the conventional cross (or other shape) radiator and the FSS 122 are related to the intrinsic impedance of a medium in which the conventional radiating structure and the FSS 122 are located. The impedance provided by the FSS 122 is also related to the distance between the FSS 122 and the ground plane 114.

The FSS 122 matches the impedance of the upper half-space (e.g. in the +Z direction) to the impedance of the microstrip feedlines 134 and 136 with significantly higher efficiency than the patch antenna 232. Since the FSS 122 is made of metal or metal-coated plastic, the integral antenna 144 is more rigid and durable than conventional designs thus improving the packaging of the radar system 100.

Referring to FIGS. 14a and 14b, a vehicle 300 incorporating the compact packaging radar system 100 is illustrated. The vehicle 300 includes a side view mirror 304 attached to a side door 305 or other component of the vehicle 300. The side view mirror 304 includes an outer housing 306 and a mechanism (not shown) for supporting and positioning a mirror 308. A window is cut from the mirror 308, and the radar system 100 is attached in the window. Alternately, if materials having proper electromagnetic properties are used, the radar system 100 can be mounted to a rear surface 310 of the mirror 308.

Alternately, the radar system 100 can be incorporated into a rear tail light assembly 320 of the vehicle 300. The rear tail light assembly 320 can include a bulb assembly 322 which illuminates through a cover 324 which can be made of plastic. The radar system 100 can be mounted on an inside surface 330 of the cover 324 of the rear tail light assembly 320, and can radiate and receive the transmit and receive signals through the cover 324 which serves as an integrated radome to replace radome 126. As can be appreciated, the cover 324 should have electromagnetic properties allowing flow of electromagnetic radiation flow therethrough. Alternately, a window can be cut from the cover 324 allowing electromagnetic radiation to directly impinge upon the radome 126 of the radar system 100.

The radar system 100 mounted on the vehicle 300, such as an automobile, can be used in intelligent cruise control systems, collision avoidance systems, predictive crash systems, lane change systems, back-up warning systems, vision enhancement systems, ground speed measuring systems, ground height measuring systems, etc. As can be appreciated, while the radar system 100 is described above in conjunction with the vehicle 300 such as an automobile, other applications will be readily apparent. For example, the radar system can be used in police radar system or in perimeter surveillance systems. The radar system can also be used as a phased array antenna for communications systems and other radar applications.

In view of the foregoing, it can be appreciated that the present invention enables the user to achieve an effective compact, flexible and integrated radar sensor. Thus, while this invention has been described in connection with a particular example thereof, no limitation is intended thereby except as defined by the following claims. This is because the skilled practitioner will realize that other modifications can be made without departing from the spirit of this invention after studying the specification and drawings.

What is claimed is:

1. A compact radar system including:
 a dielectric substrate having an upper and lower surface;
 a ground plane formed on the upper surface of the dielectric substrate and including a radiating slot formed therein;
 radar transceiver means located adjacent the lower surface of the dielectric substrate for generating transmit signals; and
 a frequency selective surface spaced above said dielectric substrate and said radiating slot and including a radiating aperture with and array of uniformly spaced holes, wherein said frequency selective surface decreases flow of electromagnetic energy from said radiating slot in one direction towards said transceiver means and increases said flow of electromagnetic radiation in an opposite direction away from said transceiver means.

2. The compact radar system of claim 1 wherein said ground plane further includes a receiving slot formed therein, said radar transceiver receives reflected signals, and said frequency selective surface includes a receiving aperture including a plurality of spaced holes.

3. The compact radar system of claim 1 wherein said plurality of spaced holes are cross-shaped.

4. The compact radar system of claim 1 wherein said plurality of spaced holes are Jerusalem cross-shaped.

5. The compact radar system of claim 1 wherein said plurality of spaced holes are circular.

6. The compact radar system of claim 1 wherein said plurality of spaced holes are tripole-shaped.

7. The compact radar system of claim 1 wherein said plurality of spaced holes are dipole-shaped.

8. The compact radar system of claim 1 wherein said plurality of spaced holes are rectangular.

9. The compact radar system of claim 1 wherein said radiating aperture is substantially square-shaped.

10. The compact radar system of claim 9 wherein said radiating slot is aligned with a diagonal of said square-shaped radiating aperture.

11. The compact radar system of claim 2 wherein said receiving aperture is substantially square-shaped.

12. The compact radar system of claim 11 wherein said receiving slot is aligned with a diagonal of said square-shaped receiving aperture.

13. The compact radar system of claim 1 further including an upper and lower housing for enclosing said radar system.

14. The compact radar system of claim 1 wherein the radar transceiver means includes radiating and receiving microstrip feedlines connected to the radiating and receiving slots.

15. The compact radar system of claim 12 wherein the microstrip feedlines are formed on the lower surface of the dielectric substrate.

16. The compact radar system of claim 12 wherein the radar system further includes a digital signal processing circuit located between the dielectric substrate and the lower housing.

17. The compact radar system of claim 1 wherein the radar system further includes means for spacing the frequency selective surface above the ground plane.

18. The compact radar system of claim 14 wherein the radiating aperture of the frequency selective surface substantially matches an impedance of the radiating microstrip feedline.

19. The compact radar system of claim 14 wherein the receiving aperture of the frequency selective surface matches an impedance of the receiving microstrip feedline.

20. The compact radar system of claim 13 wherein said upper housing is formed by a radome connected to a spacer.

21. The compact radar system of claim 20 wherein the spacer is formed by a plate including radiating and receiving holes which are aligned with the radiating and receiving apertures on the frequency selective surface when assembled.

22. The compact radar system of claim 1 further including an IF/modulator circuit located below said dielectric substrate.

23. The compact radar system of claim 22 wherein the IF/modulator circuit and the transceiver means are fabricated on the lower surface of the dielectric substrate.

24. The compact radar system of claim 1 wherein the compact radar system is incorporated into a tail light of a vehicle.

25. The compact radar system of claim 1 wherein the compact radar system is incorporated into a side mirror of a vehicle.

26. A compact radar system including:
 an upper housing with a radome connected to a spacer;
 a lower housing;
 a dielectric substrate having an upper and lower surface;
 a ground plane formed on the upper surface of the dielectric substrate and including a radiating slot and a receiving slot formed therein;
 radar transceiver means located adjacent the lower surface of the dielectric substrate for generating transmit signals and for receiving reflected transmit signals, wherein said transceiver includes radiating and receiving microstrip feedlines connected to the radiating and receiving slots;
 a frequency selective surface spaced above the upper surface of said dielectric substrate and said radiating slot and said receiving slot and including a receiving aperture and a radiating aperture each with an array of spaced holes, wherein said frequency selective surface decreases flow of electromagnetic energy from said radiating slot in one direction towards said transceiver means and increases said flow of electromagnetic radiation in an opposite direction away from said transceiver means, and wherein the frequency selective surface matches an impedance of the radiating and receiving microstrip feedlines;
 means for spacing the frequency selective surface above the ground plane: and
 a digital signal processing circuit located between the dielectric substrate and the lower housing.

27. The radar system of claim 26 wherein the radar transceiver means is fabricated on the lower surface of the dielectric substrate.

28. The compact radar system of claim 26 wherein the spacer is formed by a plate including radiating and receiving portions which are aligned with the radiating and receiving apertures on the frequency selective surface when assembled.

29. The compact radar system of claim 28 wherein at least one of the radiating and receiving apertures are substantially square and at least one of the radiating and receiving slots are formed partially along a diagonal of said at least one of the radiating and receiving apertures.

30. The compact radar system of claim 26 further including an IF/modulator circuit located below the lower surface of said dielectric substrate.

31. The compact radar system of claim 28 wherein the IF/modulator circuit and the transceiver means are fabricated on the lower surface of the dielectric substrate.

32. The compact radar system of claim 26 wherein the compact radar system is incorporated into a tail light of a vehicle.

33. The compact radar system of claim 26 wherein the compact radar system is incorporated into a side mirror of a vehicle.

34. A compact radar system including:

an upper housing with a radome connected to a spacer;

a lower housing:

a dielectric substrate having an upper and lower surface;

a ground plane formed on the upper surface of the dielectric substrate and including a radiating slot and a receiving slot formed therein:

radar transceiver means for generating transmit signals and for receiving reflected signals, wherein said transceiver includes radiating and receiving microstrip feedlines connected to the radiating and receiving slots;

a frequency selective surface spaced above said dielectric substrate and said radiating and receiving slots and including a receiving aperture and a radiating aperture each with an array of spaced holes, wherein said frequency selective surface decreases flow of electromagnetic energy from said radiating slot in one direction towards said transceiver means and increases said flow of electromagnetic radiation in an opposite direction away from said transceiver means, wherein at least one of the radiating and receiving apertures are substantially square and at least one of the radiating and receiving slots are formed partially along a diagonal of said at least one of the radiating and receiving apertures, and wherein the frequency selective surface matches an impedance of the radiating microstrip feedlines;

means for spacing the frequency selective surface above the ground plane, wherein the spacing means is formed by a plate including radiating and receiving portions which are aligned with the receive and transmit apertures on the frequency selective surface when assembled;

a digital signal processing circuit located between the dielectric substrate and the lower housing; and an IF/modulator circuit fabricated on the lower surface of the dielectric substrate.

35. The compact radar system of claim 34 wherein the compact radar system is incorporated into a tail light of a vehicle.

36. The compact radar system of claim 34 wherein the compact radar system is incorporated into a side mirror of a vehicle.

* * * * *